United States Patent [19]

Adachi et al.

[11] Patent Number: 5,309,455
[45] Date of Patent: May 3, 1994

[54] HIGH-POWER LIGHT PULSE GENERATING APPARATUS

[75] Inventors: Shoji Adachi; Nobuaki Takeuchi; Ryoji Handa, all of Tokyo, Japan

[73] Assignees: Ando Electric Co., Ltd.; Nippon Telegraph and Telephone Corporation, both of Tokyo, Japan

[21] Appl. No.: 910,198

[22] Filed: Jul. 8, 1992

[30] Foreign Application Priority Data

Jul. 12, 1991 [JP] Japan .................. 3-197337

[51] Int. Cl.$^5$ .............................................. H01S 3/10
[52] U.S. Cl. ........................................ 372/25; 372/6; 385/16
[58] Field of Search ............... 372/6, 94, 25; 359/341; 385/16

[56] References Cited

U.S. PATENT DOCUMENTS

| 5,050,183 | 9/1991 | Duling | 372/94 |
| 5,058,974 | 10/1991 | Mollenauer | 359/341 |
| 5,128,800 | 7/1992 | Zirngibl | 359/341 |
| 5,181,210 | 1/1993 | Chung et al. | 372/6 |
| 5,210,631 | 5/1993 | Huber et al. | 359/341 |
| 5,233,619 | 8/1993 | Furuhashi et al. | 372/25 |

FOREIGN PATENT DOCUMENTS 0139436  5/1985 European Pat. Off. .

Primary Examiner—James W. Davie
Attorney, Agent, or Firm—Sprung Horn Kramer & Woods

[57] ABSTRACT

A high-power light pulse generating apparatus in which an optical fiber doped with a rare earth element is used in an optical system for facilitating control and and adjustment of the apparatus. The light output power and the pulse width thereof can be varied simply by changing the characteristics and the length of the optical fiber. In the high-power light pulse generating apparatus, an output of an optical pumping light source (2) is inputted to an optical coupler (3) which constitutes an optical loop in cooperation with the optical fiber (1) doped with a rare earth element, an optical decoupler(4), an optical switch (5A), an isolator (7) and an input port of the optical coupler (3). By turning on the optical switch (5A), a high-power light pulse can be generated through the optical loop and extracted from an output port of the optical decoupler (4).

4 Claims, 2 Drawing Sheets

HIGH-POWER LIGHT PULSE GENERATING APPARATUS

BACKGROUND OF THE INVENTION

1. Field of the Invention

The present invention relates generally to a light pulse generator apparatus. More particularly, the invention is concerned with a high-power light pulse generating apparatus which includes an optical loop constituted by an optical switch, optical fiber and other optical elements and which is capable of outputting a high-power light pulse by turning on an optical switch for a short time.

2. Description of the Prior Art

For making available a light pulse of high power, there are used a gas laser and a solid laser. Among others, a Nd-doped YAG pulse laser incorporating a Q-switch can emit a peak power higher than 1 kW.

A structure of a high-power light pulse generating apparatus known heretofore is shown in FIG. 2. In this figure, a reference numeral 11 denotes a light source for optical pumping, 12 denotes a lens, 13 denotes a Nd-doped YAG laser rod, 14 denotes a pulse generator, 15 denotes a driver, 16 denotes an optical switch, and finally a numeral 17 denotes a half-mirror. The Nd-doped YAG laser rod is excited by output light of the optically pumping light source 11 through the lens 12. The pulse generator 14 drives the driver 15 for operating the optical switch 16 as a Q-switch. A part of a resonance light beam emitted through the optical switch 16 is extracted externally through the half-mirror 17. With the structure of the light pulse generating apparatus shown in FIG. 2, a light pulse of high power can be obtained. However, this known apparatus suffers from a problem that it is difficult to realize alignment of the optical axis and change a width of the light pulse because of massive configuration of the optical system as employed.

SUMMARY OF THE INVENTION

It is therefore an object of the present invention to provide a high-power light pulse generating apparatus which can easily be handled and adjusted and which allows the output power and the pulse width to be varied in a simplified and facilitated manner.

The above and other objects which will become apparent as description proceeds can be achieved by adopting an optical fiber doped with a rare earth element in the optical system for the purpose of varying the light output power and the light pulse width simply by changing the characteristic, length or other property of the optical fiber doped with rare earth element.

Thus, there is provided according to an aspect of the present invention a high power light pulse generating apparatus which comprises an optical fiber doped with a rare earth element, an optical pumping light source for pumping the optical fiber, an optical coupler having one input port connected to an output port of the optical pumping light source for introducing the output light of the optical pumping light source to the optical fiber, an optical decoupler having an input supplied with the output of the optical fiber, an optical switch having an input connected to an output port of the optical decoupler, a switch controller for controlling on/off operation of the optical switch, and an isolator having an input coupled to the output of the optical switch. An optical loop is constituted by the optical coupler, optical fiber, optical decoupler, optical switch, isolator and another input port of the optical coupler. By turning on the optical switch for a short time, a high power light pulse is generated through the optical loop and extracted from another output port of the optical decoupler.

With the structure of the high power light pulse generating apparatus mentioned above, manipulation and adjustment of the apparatus is much facilitated owing to the use of the optical fiber as an optical system. Besides, the output light power as well as the light pulse width can be changed simply by varying the characteristics, length or the like parameter of the optical fiber doped with the rare earth element.

In a mode for carrying out the invention, an optical variable filter can be inserted in an optical path defined by the optical loop. With this arrangement, the light pulse generating apparatus can be used as the high power light pulse source whose wavelength can be changed.

In another mode for carrying out the invention, the optical decoupler and the optical switch mentioned above can be replaced by a double pole type optical switch having two output ports, wherein the output light pulse can be taken out through one output port of the optical switch by taking advantage of crosstalk phenomenon.

The above and other objects, features and advantages of the present invention will be apparent by reading the following description of the preferred embodiments of the invention shown in the drawings only for the illustrative purpose.

DESCRIPTION OF THE PREFERRED EMBODIMENTS

Figure 1:
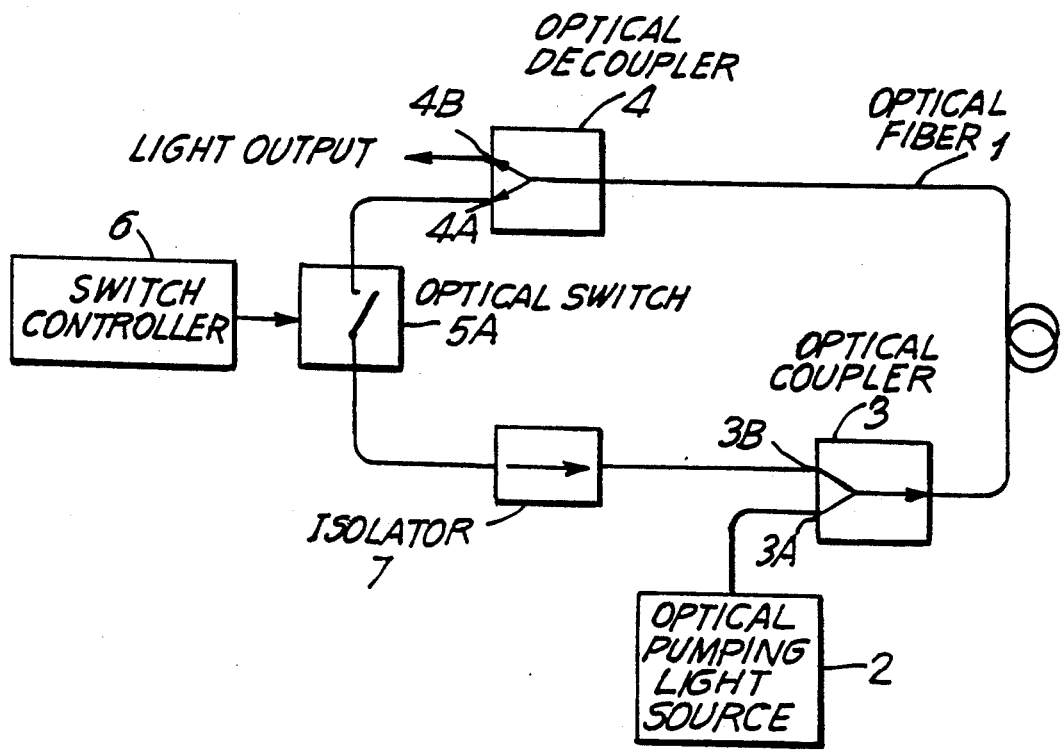
FIG. 1 is a block diagram showing a structure of the high power light pulse generating apparatus according to a first embodiment of the invention.
Figure 2:
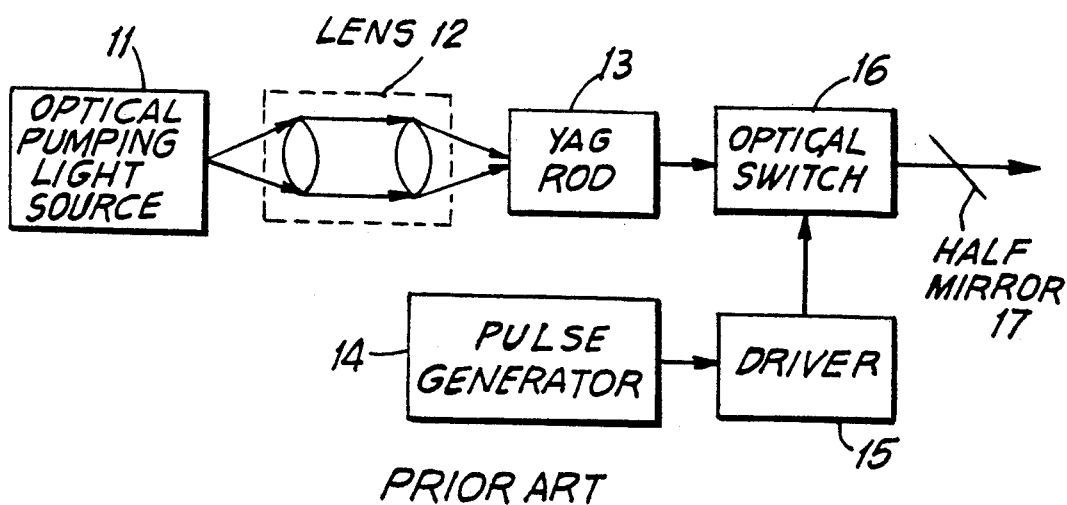
FIG. 2 is a block diagram for illustrating operation of a light pulse generator of a solid laser type known heretofore.

Now, the present invention will be described in detail in conjunction with preferred or exemplary embodiments thereof by referring to the drawings.

Referring to FIG. 1 which shows a structure of the high power light pulse generating apparatus according to a first embodiment of the invention, a reference numeral 1 denotes an optical fiber, 2 denotes a light source for optical pumping, 3 denotes an optical coupler, 4 denotes an optical decoupler, 5A denotes an optical switch, 6 denotes an optical switch controller, and a numeral 7 denotes an optical isolator. The optical fiber 1 which is doped with a rare earth element is pumped by the optical pumping light source 2. The optical coupler 3 has an input terminal or port 3A coupled to an output port of the optical pumping light source 2 and serves for introducing the output light of the pumping light source 2 to the optical fiber 1. The output end of the optical fiber 1 is coupled to an input port of the optical decoupler 4 having an output port 4A coupled to an input port of the optical switch 5A. The switch controller 6 controls on/off operation of the optical switch 5A the output of which is inputted to the isolator 7.

In the apparatus shown in FIG. 1, the optical coupler 3, the optical fiber 1, the optical decoupler 4, the optical switch 5A, the optical isolator 7 and the input port 3B of the optical coupler 3 cooperate together to constitute an optical loop. With this configuration, light pulse of high power can be generated through the optical loop by turning on the optical switch 5A for a short time, which pulse can be taken out from an output port of the optical decoupler 4B.

The optical fiber doped with a rare earth element exhibits optical amplification effect for the input light of a specific wavelength supplied from the optical pumping light source 3. By way of example, in the case of the optical fiber doped with Er, the input light having a wavelength of 1.48 μm can be amplified by the optical fiber. Accordingly, by implementing the optical system including the optical fiber in a ring-like configuration to thereby realize a positive feedback system, there can be implemented an oscillator. In the steady state where the continuous oscillation is maintained, the output light energy is on the order of several mW. However, when the optical switch 5A is turned on only for a moment in the state in which the optical fiber 1 is excited, energy excited is instantaneously amplified owing to the positive feedback through the ring-like system, whereby increased oscillation output can be obtained. At that time, the peak value and the pulse width of the output light are determined by the length and gain of the optical fiber 1. On the other hand, the oscillation wavelength is determined in dependence on the rare earth element doped to the optical fiber 1 and the wavelength of the optical pumping light source 2.

In the experiment carried out by using the optical fiber 1 which is doped with Er in combination with the optical pumping light source having a wavelength of 1.48 μm, it was shown that the oscillation wavelength is 1.535 μm. When the optical fiber has a gain of 17.3 dB, Er-concentration of 1800 ppm and a length of 10 m, there could be generated an oscillation output having a peak value of 5 W and a pulse width of 500 ns when the optical switch 5A was turned on for a time of 1.2 μs. Further, in the case of the optical fiber having a gain of 12.2 dB, Er-concentration of 1800 ppm and a length of 80 m, the oscillation output has a peak value of 1 W and a pulse width of 5 μs when the optical switch 5A is turned on for a time of 1.2 μs.

Figure 5:
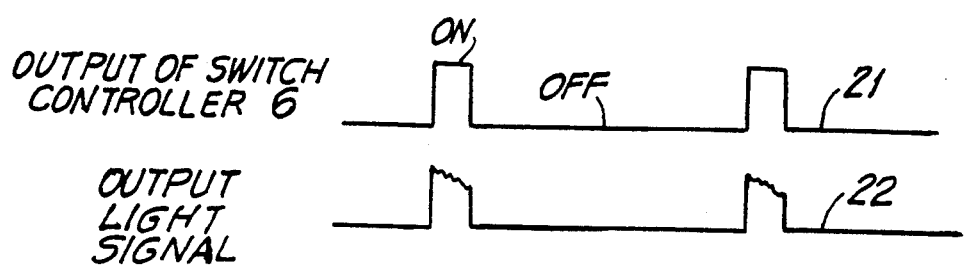
FIG. 5 is a waveform diagram illustrating waveforms of an optical switch control signal and an output light pulse signal, respectively.

FIG. 5 is a waveform diagram for illustrating the operation of the high-power light pulse generating apparatus. More specifically, FIG. 5 shows in waveform diagrams the output signal of the switch controller 6 and the output light signal generated by the apparatus. In the figure, a reference numeral 21 designates the output signal waveform of the switch controller 6 which drives the optical switch 5A, wherein a high level represents the ON-operation of the optical switch 5A while a low level represents the OFF-state thereof. The output light signal 22 is generated in response to the ON operation of the optical switch 5A. By varying the pulse width of the switch control signal 21, the pulse width of the output light signal 22 can correspondingly be varied.

Figure 3:
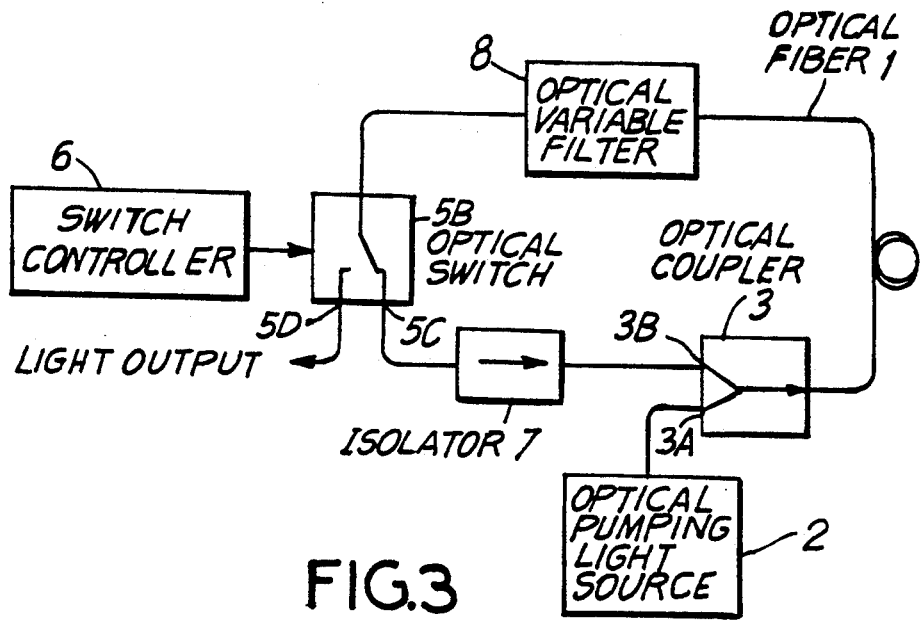
FIG. 3 is a block diagram showing a structure of the high power light pulse generating apparatus according to a second embodiment of the invention.

FIG. 3 shows in a block diagram a structure of the high-power light pulse generating apparatus according to a second embodiment of the invention. This apparatus differs from the apparatus according to the first embodiment in the respect that the optical decoupler 4 and the optical switch 5A of the latter are replaced by a double-pole switch 5B which is conventionally employed in a light pulse tester or the like. In the case of the high-power light pulse generating apparatus according to the second embodiment, the light output can be taken out by making use of cross-talk coupling to an output port 5D of the optical switch 5B. By inserting an optical variable filter 8 in the optical loop, it is possible to change the wavelength of the output light. Of course, the optical variable filter 8 may be spared. The apparatus according to the second embodiment can be implemented inexpensively when compared with that of the first embodiment.

Figure 4:
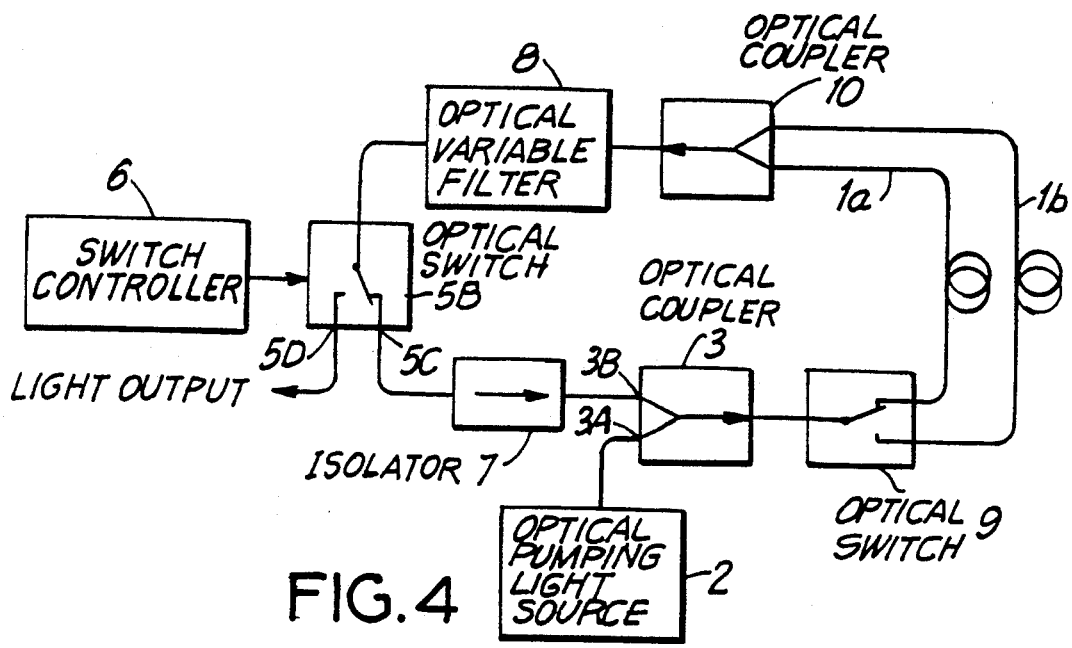
FIG. 4 is a block diagram showing a structure of the high power light pulse generating apparatus according to a third embodiment of the invention.

FIG. 4 shows a structure of the high-power light pulse generating apparatus according to a third embodiment of the invention. This apparatus differs from that of the second embodiment in that an optical switch 9 and an optical coupler 10 are additionally provided. The optical switch 9 serves for changing over the optical path between optical fibers 1a and 1b. By employing as the optical fibers 1a and 1b the optical fibers which differ each other in respect to the characteristics, respectively, the pulse width and the peak value of the output light can be changed simply by changing over the optical fibers 1a and 1b to each other by means of the optical switch 9. In this conjunction, it will readily be appreciated that by selecting appropriately the number of poles of the optical switch 9, the number of the optical fibers and the number of the input ports of the optical decoupler 10, as occasion requires, it is possible to change the pulse width and the peak value among a corresponding number of different values. Furthermore, by providing the optical coupler 3 and the optical pumping light source 2 for the optical fibers 1a and 1b, respectively, there can be realized a high-power light pulse generating apparatus whose light output can be changed over among a plurality of different wavelengths.

As will be appreciated from the above description, with the structures of the high power light pulse generating apparatus, manipulation and adjustment of the apparatus can be much facilitated owing to the use of the optical fiber in the optical loop or system. Besides, the output light power as well as the light pulse width can be changed simply by varying the characteristics, length or the like parameter of the optical fiber doped with the rare earth element. Further, by inserting a wavelength variable filter in the optical path, the light pulse generating apparatus can be used as the high power light pulse source whose wavelength can be varied.

Many features and advantages of the present invention are apparent from the detailed description and thus it is intended by the appended claims to cover all such features and advantages of the system which fall within the true spirit and scope of the invention. Further, since numerous modifications and changes will readily occur to those skilled in the art, it is not desired to limit the invention to the embodiments illustrated and described. Accordingly, all suitable modifications and equivalents may be resorted to, falling within the scope of the invention.

We claim:

1. A high power light pulse generating apparatus, comprising:
   an optical fiber doped with a rare earth element;
   an optical pumping light source for optically pumping said optical fiber;
   an optical coupler having a first input port coupled to an output port of said optical pumping light source for introducing the output light of said optical pumping light source to said optical fiber and having a second input port;
   an optical decoupler having an input port supplied with the output of said optical fiber and having first and second output ports;
   an optical switch having an input port coupled to the first output port of said optical decoupler;
   an isolator having an input port coupled to the output port of said optical switch;
   wherein said optical coupler, said optical fiber, said optical decoupler, said optical switch, said isolator and the second input port of said optical coupler comprise an optical loop which is opened and closed by the optical switch; and
   a switch controller for controlling the optical switch to effect the closing of the optical loop for a given time period to produce a high power light pulse at the second output port of the optical decoupler having a pulse width of said given time period.

2. A high power light pulse generating apparatus, comprising:
   an optical fiber doped with a rare earth element;
   an optical pumping light source for optically pumping said optical fiber;
   an optical coupler having a first input port coupled to an output port of said optical pumping light source for introducing the output light of said optical pumping light source to said optical fiber and having a second input port;
   a double-pole optical switch having an input port supplied with the output of said optical fiber and having first and second output ports;
   an isolator having an input port coupled to the first output port of said optical switch;
   wherein said optical coupler, said optical fiber, the input port and first output port of, said optical switch, said isolator and the second input port of said optical coupler comprise an optical loop which is opened and closed by the optical switch; and
   a switch controller for controlling the optical switch to effect the closing of the optical loop for a given time period to produce a high power light pulse at the second output port of the optical switch having a pulse width of said given time period.

3. A high power light pulse generating apparatus, comprising:
   an optical fiber doped with a rare earth element;
   an optical pumping light source for optically pumping said optical fiber;
   an optical coupler having a first input port coupled to an output port of said optical pumping light source for introducing an output light of said optical pumping light source to said optical fiber and having a second input port;
   an optical variable filter having an input port supplied with the output of said optical fiber;
   a double-pole optical switch having an input port supplied with the output of said optical variable filter and having first and second output ports;
   an isolator having an input port coupled to the first output port of said optical switch;
   wherein said optical coupler, said optical fiber, said optical variable filter, the input port and the first output port of said optical switch, said isolator and the second input port of said optical coupler comprise an optical loop which is opened and closed by the optical switch; and
   a switch controller for controlling the optical switch to effect the closing of the optical loop for a given time period to produce a high power light pulse at the second output port of the optical switch having a pulse width of said given time period.

4. A high power light pulse generating apparatus, comprising:
   an optical fiber doped with rare earth elements;
   an optical pumping light source for pumping said at least two optical fibers;
   a first optical coupler having a first input port coupled to an output port of said optical pumping light source and having first and second input ports;
   a first double-pole optical switch having an input port coupled to an output port of said first optical coupler and having first and second output ports;
   a second optical coupler coupled to the first and second output ports of said first optical switch for coupling together outputs of the at least two optical fibers;
   a second double-pole optical switch having an input port coupled to an output port of said second optical coupler and having first and second output ports;
   an isolator coupled to the first output port of said second optical switch;
   wherein said first optical fiber, one of said at least two optical fibers, said second optical coupler, the input port and first output port of said second optical switch, said isolator and a second input port of said first optical coupler comprise an optical loop which is opened and closed by the second optical switch; and
   a switch controller for controlling the second optical switch to effect the closing of the optical loop for a given time period to produce a high power light pulse at the second output port of the second optical switch having a pulse width of said given time period.

* * * * *